United States Patent [19]

Reitnouer

[11] Patent Number: 5,425,608
[45] Date of Patent: Jun. 20, 1995

[54] COIL RACK FOR FLATBED TRAILER

[75] Inventor: Miles A. Reitnouer, Reading, Pa.

[73] Assignee: Reitnouer, Inc., Reading, Pa.

[21] Appl. No.: 314,736

[22] Filed: Sep. 29, 1994

[51] Int. Cl.⁶ ............................................. B60P 7/08
[52] U.S. Cl. ........................................ 410/49; 410/50
[58] Field of Search ...................... 410/30, 47, 48, 49, 410/50, 42, 80; 188/32

[56] References Cited

U.S. PATENT DOCUMENTS

| | | | |
|---|---|---|---|
| 2,413,744 | 1/1947 | Carter | 410/49 |
| 2,611,495 | 9/1952 | Weaver | 410/42 |
| 3,110,361 | 11/1963 | Hirsch | 410/30 |
| 3,843,156 | 10/1974 | Alfriend, Jr. et al. | 410/49 |
| 3,876,173 | 4/1975 | Cline | 188/32 |
| 4,106,735 | 8/1978 | Partain et al. | 410/49 |
| 4,685,846 | 8/1987 | Golay et al. | 410/47 X |

Primary Examiner—Michael S. Huppert
Assistant Examiner—Stephen Gordon

[57] ABSTRACT

A coil rack for preventing the rolling of circularly-shaped payloads on a flatbed trailer. The coil rack has a base that can be releasably secured to the flatbed trailer. A stop surface extends upwardly and perpendicularly from the base to prevent the payload from rolling. An "L-shaped" flange extends from the bottom of the base and engages a corresponding "L-shaped" channel in the head of an "I-beam" which forms a portion of the flatbed trailer. A brace surface is also coupled between the stop surface and the base for strength. The use of pairs of these coil racks, one on each side of the payload, along the length of the flatbed trailer, prevents the payload from rolling.

1 Claim, 3 Drawing Sheets

COIL RACK FOR FLATBED TRAILER

FIELD OF THE INVENTION

The invention pertains to devices that provide securement for flatbed trailer payloads. In particular, the invention pertains to a coil rack that couples to the trailer bed for preventing circular-shaped payloads from rolling off the trailer bed.

BACKGROUND OF INVENTION

Flatbed trailers are designed to carry various kinds of payloads. In many cases, these payloads, once loaded onto the flatbed, must also be secured from rolling off the flatbed. For example, transformer coils that are loaded onto flatbed trailers have a tendency to roll due to their circular shape. Typically, the transformer coil is prevented from rolling by the use of chocks that are wedged between the coil periphery and the trailer bed on each side of the coil. These chocks are coupled to each other by a heavy-duty band upon which the transformer coil rests. The weight of the coil payload presses down on the band and, therefore, holds the chock-band assembly against the bed. The chocks then act to counter any rolling tendency of the coil.

However, reliance only on the payload weight to hold the chock-band assembly in place on the trailer bed is marginal. If insufficient frictional forces are generated between the band and the truck bed or between the chocks and the trailer bed, the entire transformer coil-band-chock assembly can slide across the bed.

Hence, there remains a need to provide for the releasable securement of chocks to the flatbed trailer that do not rely on the payload's own weight to prevent the rolling tendency of circular payloads.

OBJECTS OF THE INVENTION

Accordingly, it is the general object of this invention to provide a coil rack for a flatbed trailer which overcomes the disadvantages of the prior art.

It is a further object of this invention to provide a coil rack that is releasably secured to the trailer of a flatbed for preventing circular payloads from rolling on the trailer.

SUMMARY OF THE INVENTION

These and other objects of the instant invention are achieved by providing a coil rack for preventing a circular payload from rolling on a flatbed trailer which comprises a base for resting on the flatbed trailer and where the base has a bottom surface, a stop surface which is disposed upwardly and perpendicularly from the base and where the stop surface has an inner side and an outer side, and means for releasably securing the base to the flatbed trailer.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
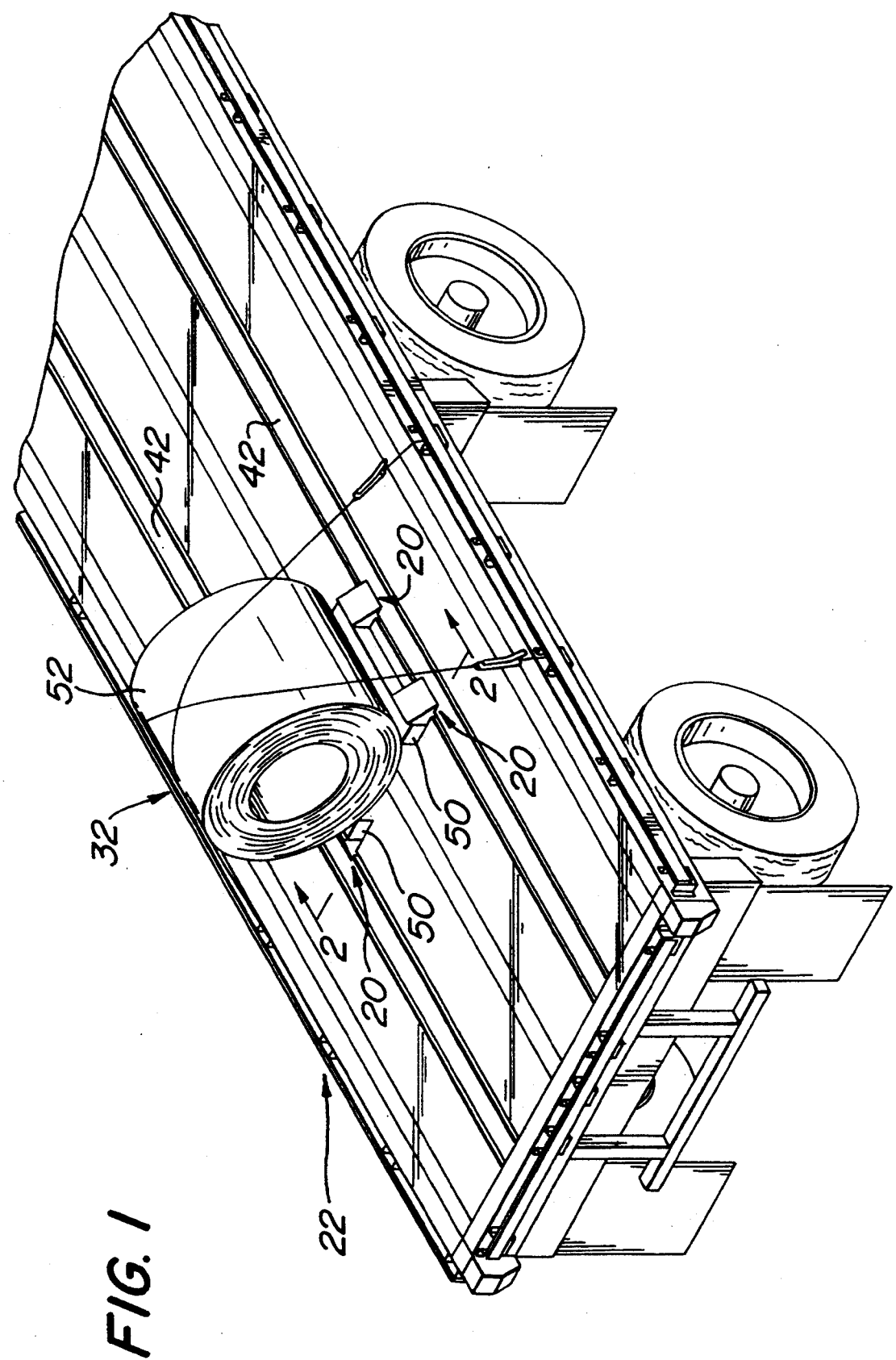
FIG. 1 is a three-dimensional view of a plurality of the coil racks of the present invention in use on a trailer flatbed.
Figure 2:
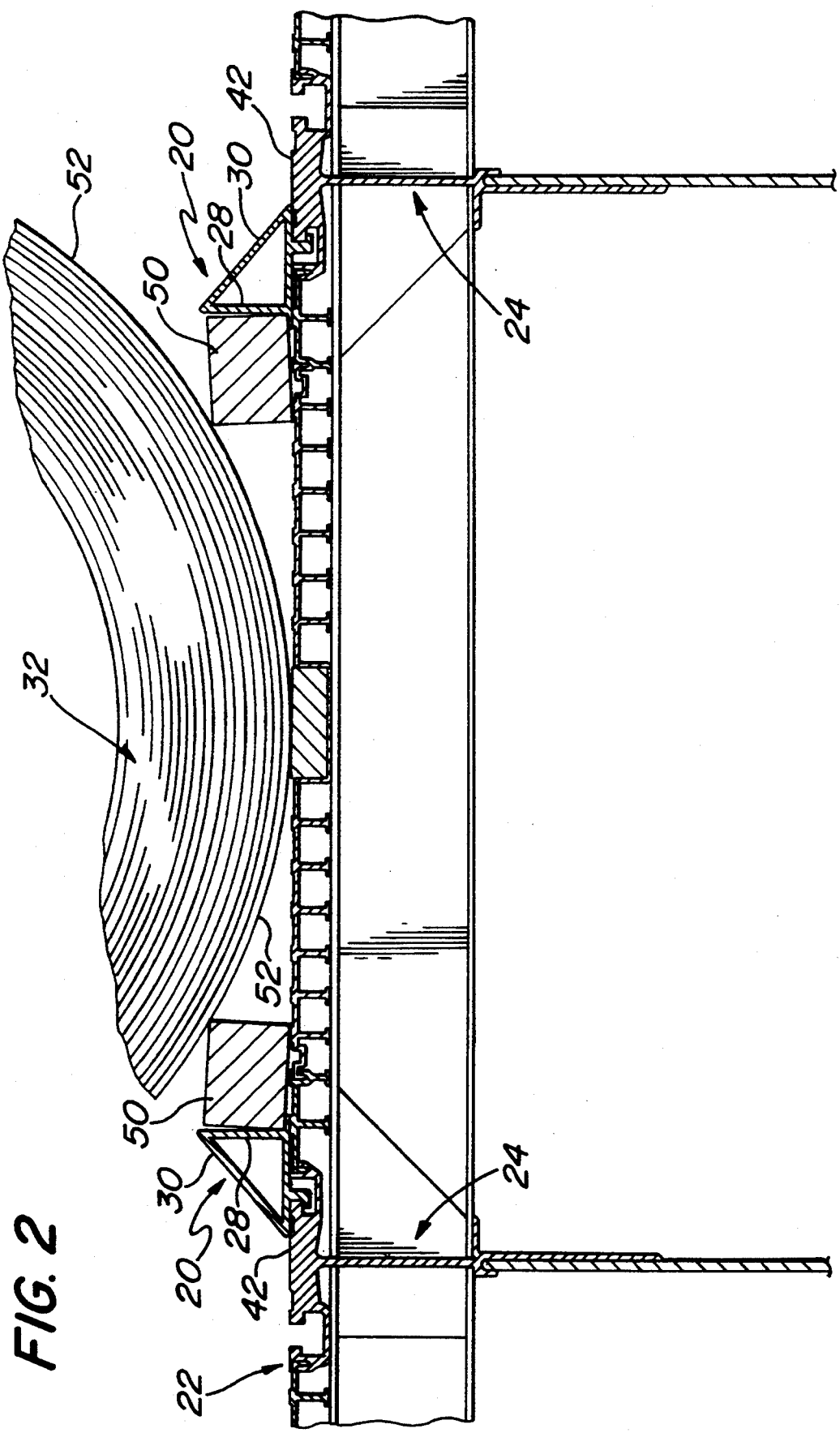
FIG. 2 is an enlarged sectional view taken along line 2—2 of FIG. 1.
Figure 3:
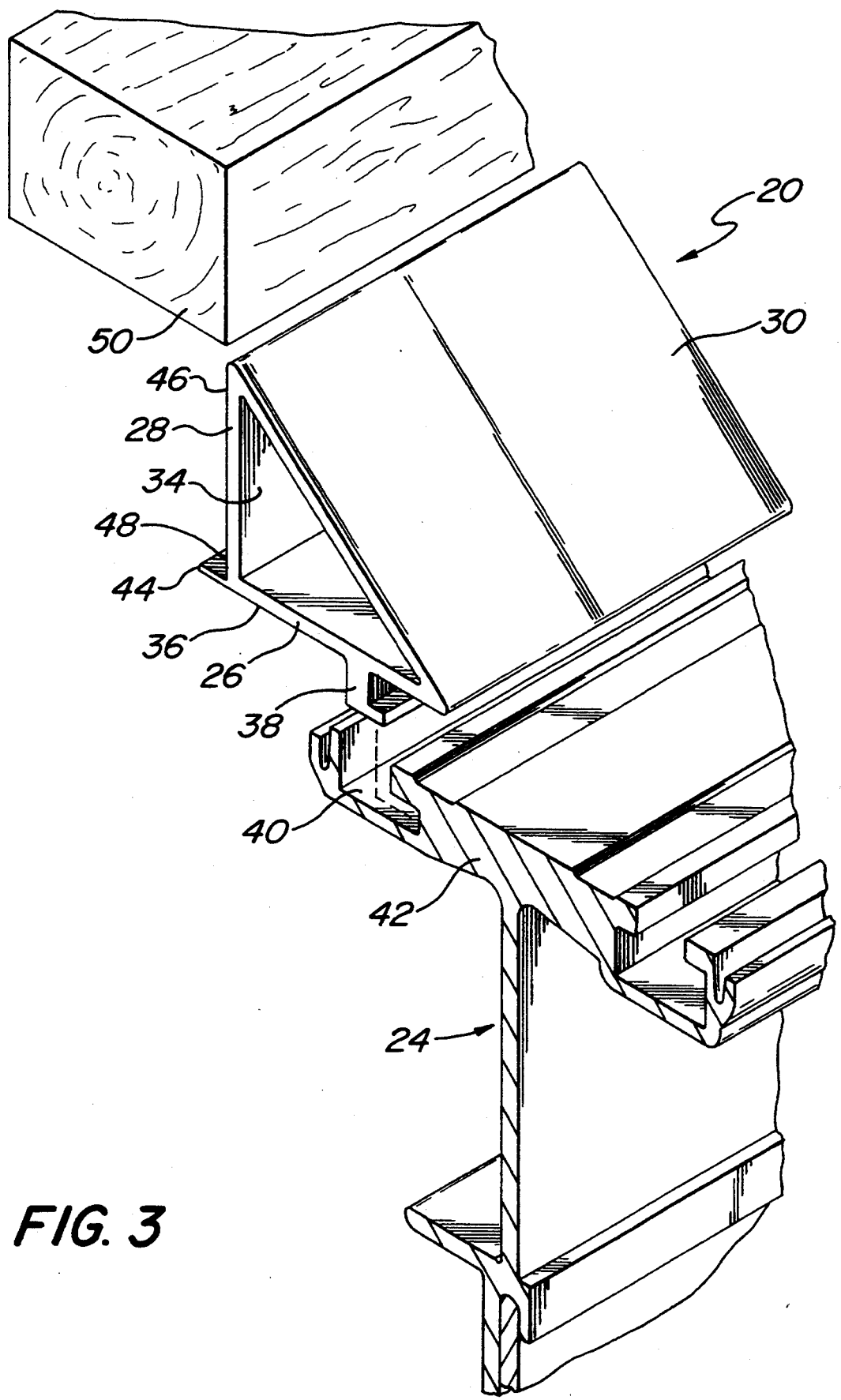
FIG. 3 is an exploded view, partly in section, showing the coil rack as it is secured to the flatbed trailer.

Referring now in detail to the various figures of the drawing wherein like reference characters refer to like parts, there is shown at 20 in FIG. 3, a coil rack that is to be coupled to a flatbed trailer 22 (FIG. 1). At this juncture, it is necessary to point out that the flatbed trailer 22 comprises a plurality of unique "I-beams." FIG. 2 shows these "I-beams" 24, the importance of which will be discussed later.

As shown most clearly in FIG. 3, the coil rack 20 comprises a base 26, a stop surface 28 and a brace surface 30. The stop surface 28 extends upwardly and perpendicularly from the base 26 and provides the blocking means against which the payload 32 (FIGS. 1 and 2) ultimately rests. The brace surface 30 is coupled between the base 26 and the stop surface 28 to support the stop surface 28 at the inner side 34 of stop surface 28.

The base 26 has a bottom surface 36 (FIG. 3) from which an "L-shaped" flange 38 extends. This "L-shaped" flange 38 engages and locks into a corresponding "L-shaped" channel 40 located in the head 42 of the "I-beam" 24, thereby securing the coil rack 20 to the flatbed trailer 22. In addition, the "L-shaped" flange 38 can be easily disengaged from the "L-shaped" channel 40 and secured at another location along the "L-shaped" channel 40, thereby making the coil rack 20 a releasably-securable device.

A spacer flange 44 extends perpendicularly away from the outer side 46 of the stop surface 28 at the base 26. The spacer flange 44 and the outer side 46 form a channel 48 for receiving a corner of a spacer 50. The spacer 50 provides a tight fit between the circular periphery 52 of the payload 32 and the stop surface 28.

Typically, pairs of coil racks 20 are used on a flatbed trailer 22, as shown in FIG. 1, to secure the payload 32 to the trailer 22 and, thereby, prevent the payload 32 from rolling. All coil racks 20 that are located on one side of the payload 32 are coupled to a common "I-beam" 24 in an identical manner as discussed above. The coil racks 20 that are located on the other side of the payload 32 are coupled to another common "I-beam" 24 in the same manner. Each spacer 50 is usually of a length necessary to span the distance between coil racks 20 that are coupled to a common "I-beam" 24.

Where the payload 32 is large enough, the coil racks 20 can be used without the spacer 50, since the circular periphery 52 will be in direct contact with the respective stop surfaces 28 of the various coil racks 20.

Preferably, the base 26, the stop surface 28, the brace surface 30, the "L-shaped" flange 38 and the spacer flange 44 comprise a single extrusion of a strong and durable material, e.g., aluminum 6061-T6.

Without further elaboration, the foregoing will so fully illustrate my invention that others may, by applying current or future knowledge, readily adopt the same for use under various conditions of service.

I claim:

1. A coil rack for preventing a circular payload from rolling on a flatbed trailer having an "L-shaped" channel therein, said coil rack comprising:

a base for resting on the flatbed trailer, said base having a bottom surface;

a stop surface disposed upwardly and perpendicularly from said base, said stop surface having an inner side and an outer side;

a brace surface coupled between said base and said inner side of said stop surface;

an "L-shaped" flan extending from said bottom surface of said base, said flange for releasably locking into the "L-shaped" channel in the flatbed trailer;

said base having a spacer flange that is perpendicularly disposed away from said outer side of said stop surface, said spacer flange and said outer surface forming a channel for receipt of a spacer, the spacer being configured to provide a tight fit between said outer side of said stop surface and the circular payload; and wherein said base, said stop surface, said "L-shaped" flange, said brace surface and said spacer flange comprise a single extrusion.

* * * * *